US012731217B2

(12) United States Patent
Heo et al.

(10) Patent No.: US 12,731,217 B2
(45) Date of Patent: Sep. 8, 2026

(54) IMAGE PROCESSOR AND IMAGE PROCESSING SYSTEM INCLUDING THE SAME

(71) Applicant: Samsung Electronics Co., Ltd., Suwon-si (KR)

(72) Inventors: Giyoung Heo, Suwon-si (KR); Daeho Lee, Suwon-si (KR); Minseok Lee, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 44 days.

(21) Appl. No.: 18/417,246

(22) Filed: Jan. 19, 2024

(65) Prior Publication Data

US 2024/0257310 A1 Aug. 1, 2024

(30) Foreign Application Priority Data

Jan. 31, 2023 (KR) ........................ 10-2023-0013192

(51) Int. Cl.
*G06T 5/50* (2006.01)
*G06T 5/70* (2024.01)

(52) U.S. Cl.
CPC .................. *G06T 5/50* (2013.01); *G06T 5/70* (2024.01); *G06T 2207/10144* (2013.01); *G06T 2207/20208* (2013.01)

(58) Field of Classification Search
CPC . G06T 2207/10144; G06T 2207/20208; G06T 5/50; G06T 5/70; G06T 5/92
See application file for complete search history.

(56) References Cited

U.S. PATENT DOCUMENTS 7,612,804 B1 * 11/2009 Marcu ..................... G06T 7/136 348/222.1
8,970,727 B2 * 3/2015 Shinmei ................. H04N 23/88 348/223.1
9,338,349 B2 5/2016 Sharma et al.
9,438,827 B2 9/2016 Li
9,628,721 B2 * 4/2017 Moon .................. H04N 23/741
9,973,709 B2 5/2018 You et al.
10,255,888 B2 4/2019 Narasimha et al.
10,638,052 B2 4/2020 Dhiman et al.
11,082,625 B2 8/2021 Kang et al.
11,290,655 B1 * 3/2022 Kim ....................... H04N 23/81
(Continued)

FOREIGN PATENT DOCUMENTS

KR 101698876 B1 1/2017

*Primary Examiner* — Ming Wu
(74) *Attorney, Agent, or Firm* — Harness, Dickey & Pierce, P.L.C.

(57) ABSTRACT

An image processor including an interface circuit configured to receive a plurality of images corresponding to a plurality of exposure times from an external sensor, and a high dynamic range (HDR) synthesis circuit configured to synthesize a first HDR image, based on a first image and a second image among the plurality of images, synthesize a second HDR image, based on a third image among the plurality of images and the first HDR image, apply a first weight including weight values respectively corresponding to pixels of the first HDR image to the first HDR image, and apply a second weight including weight values respectively corresponding to pixels of the third image to the third image to synthesize the second HDR image.

18 Claims, 8 Drawing Sheets

(56) References Cited

U.S. PATENT DOCUMENTS

| | | | | |
|---|---|---|---|---|
| 11,379,997 | B2 | 7/2022 | Lee et al. | |
| 2023/0206399 | A1* | 6/2023 | Dong | G06T 3/4053 345/667 |

* cited by examiner

OBJECT

LS

100

IMAGE SENSOR

110

PRE-PROCESSOR

200

IMAGE PROCESSOR

210

HDR SYNTHESIS CIRCUIT

211 MIXER

212 RDMA1

213 RDMA2

214 RDMA3

215 RDMA4

216 WDMA1

217 WDMA2

218 I/F

219 FIRST CIRCUIT

IMAGE PROCESSOR AND IMAGE PROCESSING SYSTEM INCLUDING THE SAME

CROSS-REFERENCE TO RELATED APPLICATION

This application is based on and claims priority under 35 U.S.C. § 119 to Korean Patent Application No. 10-2023-0013192, filed on Jan. 31, 2023, in the Korean Intellectual Property Office, the disclosure of which is incorporated by reference herein in its entirety.

BACKGROUND

The inventive concepts relate to .image processor, and more specifically, to image processors for generating a high dynamic range (HDR) image and image processing systems including the same.

An image processing system such as a camera may include an image sensor that converts an optical signal of an object incident through an optical lens into an image as an electrical signal, and a processor that performs image processing on the generated image. The range of brightness that may be accommodated by the image sensor is narrower than the range of brightness that may be accommodated by the human eye. Therefore, an image taken under a backlight situation may differ from an actual image seen by the human eye, such as a bright background and an excessively dark object. Accordingly, an HDR technique is used in which a plurality of images having different exposure times are generated by imaging the same object at different exposure times, and a plurality of images are image-processed to widen the dynamic range of the image.

SUMMARY

The inventive concepts provide image processors capable of reducing noise by applying a weight value corresponding to each pixel of images when synthesizing HDR images using images corresponding to three different exposure times and image processing systems including the same.

According to some aspects of the inventive concepts, there is provided an image processor including an interface circuit configured to receive a plurality of images corresponding to a plurality of exposure times from an external sensor, and a high dynamic range (HDR) synthesis circuit configured to synthesize a first HDR image, based on a first image and a second image among the plurality of images, synthesize a second HDR image, based on a third image among the plurality of images and the first HDR image, apply a first weight including weight values respectively corresponding to pixels of the first HDR image to the first HDR image, and apply a second weight including weight values respectively corresponding to pixels of the third image to the third image to synthesize the second HDR image.

According to some aspects of the inventive concepts, there is provided an operating method of an image processor including an HDR synthesis circuit, the method including obtaining a plurality of images corresponding to a plurality of exposure times, synthesizing a first HDR image based on a first image and a second image having different exposure times among the plurality of images, and applying a first weight including weight values respectively corresponding to each pixel of the first HDR image to the first HDR image, and applying a first weight including weight values respectively corresponding to each pixel of the first HDR image to the first HDR image, and applying a second weight including weight values corresponding to pixels of a third image to the third image to synthesize the second HDR image, the plurality of images include the third image, an exposure time corresponding to the third image being shorter than an exposure time corresponding to the first image and an exposure time corresponding to the second image.

According to some aspects of the inventive concepts, there is provided an image processing system including an image sensor configured to generate a plurality of images corresponding to a plurality of exposure times, and a processor configured to receive the plurality of images from the image sensor, synthesize an HDR image, based on the plurality of images, synthesize a second HDR image, based on the first HDR image and one of the plurality of images, apply a first weight including weight values respectively corresponding to pixels of the first HDR image to the first HDR image, and apply a second weight including weight values respectively corresponding to pixels of any one of the plurality of images to any one of the plurality of images to synthesize the second HDR image.

BRIEF DESCRIPTION OF THE DRAWINGS

Example embodiments will be more clearly understood from the following detailed description taken in conjunction with the accompanying drawings in which:

FIG. 1 is a block diagram illustrating an image processing system according to some example embodiments;

FIG. 3 is a block diagram illustrating an HDR synthesis circuit according to some example embodiments;

DETAILED DESCRIPTION

Figure 1:
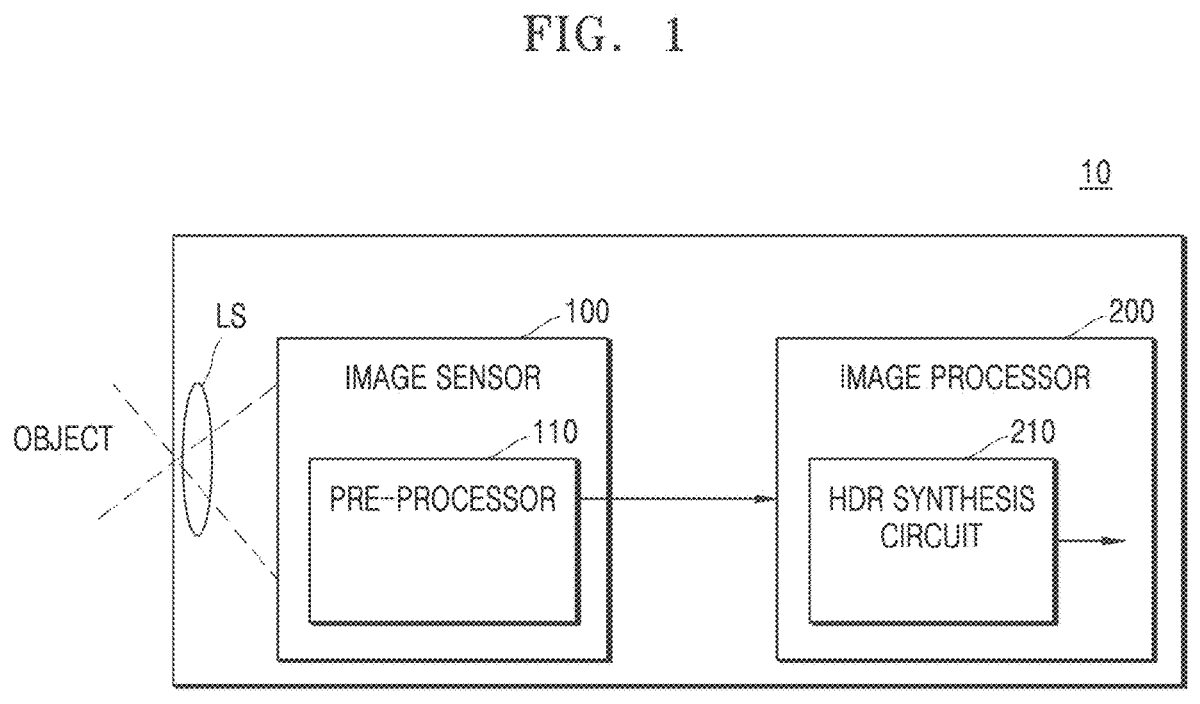
Figure 2:
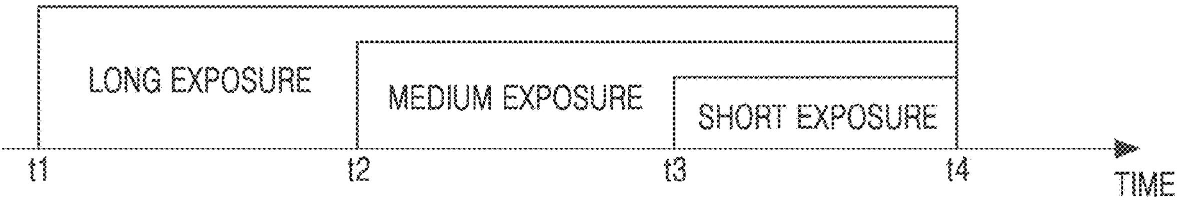
FIG. 2 is a graph for explaining a process of synthesizing a high dynamic range (HDR) image using a plurality of images corresponding to a plurality of exposure times, according to some example embodiments.

FIG. 1 is a block diagram illustrating an image processing system according to some example embodiments.

The image processing system 10 may be embedded in an electronic device or implemented as an electronic device. An electronic device is a device that captures an image, displays the captured image, or performs an operation based on the captured image, and for example, may include electronic devices, such as digital cameras, smartphones, wearable devices, Internet of Things (IoT) devices, personal computers (PCs), tablet PCs, personal digital assistants (PDAs), portable multimedia players (PMPs), navigation devices, drones, and the like, or may be mounted on electronic devices provided as parts of vehicles, medical devices, furniture, manufacturing facilities, security devices, doors, various measuring devices, and the like.

Referring to FIG. 1, an image processing system 10 may include an image sensor 100 and an image processor 200. The image processing system 10 may further include other components such as a display and a user interface. The image sensor 100 may include a pre-processor 110, and the image processor 200 may include a high dynamic range (HDR) synthesis circuit 210 that performs HDR processing.

The image sensor 100 may convert an optical signal of an object incident through the optical lens LS into an electrical signal and generate an image based on the electrical signals. The image sensor 100 may generate a plurality of images of the same object with different luminance. In some example embodiments, the image sensor 100 may generate multiple exposure images by imaging the same object based on different exposure times. Alternatively, when a plurality of photoelectric conversion elements are provided in each of the pixels of the pixel array, the image sensor 100 may generate a plurality of images having different luminance by adjusting the number of photoelectric conversion elements used for image sensing. For example, the image sensor 100 may generate a first image corresponding to the first exposure time, a second image corresponding to a second exposure time shorter than the first exposure time, and a third image corresponding to a third exposure time shorter than the second exposure time, and transmit the first to third images to the image processor 200. The first image, the second image, and the third image may include the same or substantially the same view, focus and/or objects. In some example embodiments, the first exposure time, the second exposure time, and the third exposure time all overlap one another. Some example embodiments of this will be described later with reference to FIG. 2. The preprocessor 110 may perform image signal processing such as binning, re-mosaic, and/or bad pixel correction.

The image processor 200 may perform image processing on the received image. At this time, image processing may include various processes, for example, image quality improvement processing such as noise removal, brightness adjustment, and sharpness adjustment, image size change, image processing that changes the data format (e.g., changing the Bayer pattern image data to YUV or RGB format), and the like.

The HDR synthesis circuit 210 may synthesize an HDR image based on a plurality of images corresponding to a plurality of exposure times received from the image sensor 100 and may generate a weight map. The weight map may refer to weight values including weight values corresponding to each pixel of the synthesized HDR image when the HDR synthesis circuit 210 synthesizes the HDR image. In some example embodiments, the weight value may have a value of 0 to 255, and the weight map may include a first weight, a second weight, and a third weight. However, the technical concepts of the inventive concepts are not limited thereto, and may have a different value according to pixel data of images.

In some example embodiments, the HDR synthesis circuit 210 may synthesize a first HDR image based on two images among a plurality of images and may generate a first weight. For example, when synthesizing a first HDR image, the HDR synthesizing circuit 210 may generate a first weight based on a synthesizing ratio (for example, reflecting the synthesizing ratio) of two images. The first weight may include weight values corresponding to each pixel of the first HDR image.

In some example embodiments, the HDR synthesis circuit 210 may synthesize a second HDR image by synthesizing any one image other than the two synthesized images and the previously synthesized first HDR image. For example, a second HDR image may be synthesized by applying a first weight to a first HDR image and applying a second weight to any one image other than the two synthesized images. The second weight may include weight values corresponding to each pixel of any one image other than the two synthesized images. When synthesizing the second HDR image, each pixel may be synthesized using the following [Equation 1].

$$I_3 = \frac{w_1 I_1 + w_2 I_2}{w_1 + w_2} \quad \text{[Equation 1]}$$

In [Equation 1], $W_1$ may be a first weight, $W_2$ may be a second weight, $I_1$ may be a pixel value of the first HDR image, $I_2$ may be a pixel value of any one image other than the two synthesized images, and $I_3$ may be a pixel value of a second HDR image.

When synthesizing the second HDR image, since a first weight based on (for example, reflecting) the synthesis ratio of the two images synthesized to the previously synthesized first HDR image is applied to each pixel, an HDR image may be synthesized based on (for example, by reflecting) the synthesis weight of the two images for each pixel. For example, HDR images in which noise variance or motion are reflected may be synthesized.

In some example embodiments, the image processor 200 may further include a post-processing module. For example, when synthesizing a second HDR image, the HDR synthesis circuit 210 may generate a third weight and transmit the third weight and the second HDR image to a post-processing module. The post-processing module may perform a post-processing operation for removing noise based on the third weight and the second HDR image. Some example embodiments of this will be described later with reference to FIG. 4.

HDR synthesis may include linearization processing and dynamic range compression (DRC) processing. DRC processing may include tone mapping (e.g., gamma correction). According to tone mapping, a relatively bright area in an image may be corrected to be dark and a dark area to be bright.

The image processor 200 may be implemented as hardware, software (or firmware), or a combination of hardware and software. The image processor 200 may be implemented as one of various types of processors capable of performing image processing, such as a GPU, a digital signal processor (DSP), and an image signal processor (ISP). The image processor 200 may be implemented as a single chip or embedded in an application processor (AP).

In some example embodiments, the image processor 200 may output the second HDR image such that a display device is controlled to display the second HDR image, and/or a storage device is controlled to store the second HDR image. Some example embodiments of this will be described later with reference to FIG. 7.

FIG. 2 is a graph for explaining a plurality of images corresponding to a plurality of exposure times according to some example embodiments.

Referring to FIGS. 1 and 2, the image sensor 100 may generate a plurality of images corresponding to a plurality of exposure times. In some example embodiments, the image sensor 100 may generate three images corresponding to three exposure times. For example, the first exposure time may correspond to exposure times of t4 to t1 and may correspond to the longest exposure time. The second exposure time may correspond to an exposure time of t4 to t2, and may correspond to an exposure time shorter than the first exposure time. The third exposure time may correspond to exposure times of t4 to t3 and may correspond to the shortest exposure time. A long exposure image corresponding to the first exposure time may be referred to as a first image. A medium exposure image corresponding to the second exposure time may be referred to as a second image. A short exposure image corresponding to the third exposure time may be referred to as a third image. In some example embodiments, the exposure times may be shifted towards a front or middle of the long exposure times. For example, in some example embodiments, the third exposure time (the short exposure image) may correspond to exposure times of t1 to t2, or t2 to t3. In some example embodiments, the second exposure time (the medium exposure image) may correspond to exposure times of t1 to t3. However, the technical ideas of the inventive concepts are not limited thereto, and, for example, the exposure times may not have the same or similar time references.

Figure 3:
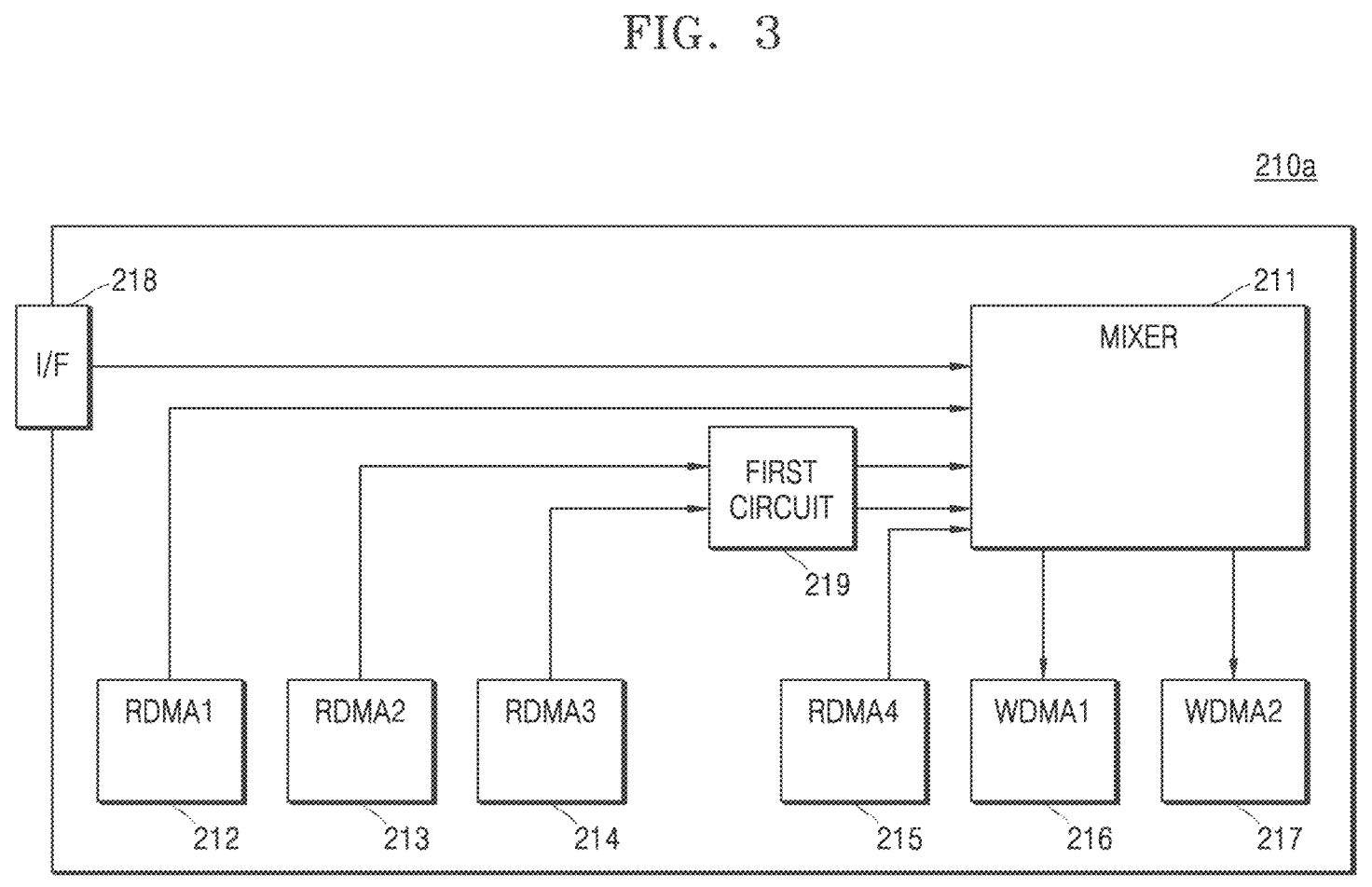

FIG. 3 is a block diagram illustrating an HDR synthesis circuit according to some example embodiments. In some example embodiments, HDR synthesis circuit 210*a* of FIG. 3 may be an example of HDR synthesis circuit 210 of FIG. 1.

Referring to FIG. 3, the HDR synthesis circuit 210*a* may include a mixer 211, a plurality of read direct memory access (RDMA) 212 to 215, a plurality of write direct memory access (WDMA) 216 and 217, an interface (I/F) circuit 218, and a first circuit 219.

The mixer 211 may synthesize an HDR image based on a plurality of images corresponding to a plurality of exposure times and may generate a weight map. The weight map may include first to third weights. In some example embodiments, the mixer 211 may synthesize an HDR image based on two images having different exposure times and may generate a first weight. For example, further referring to FIG. 2, the mixer 211 may receive a second image (middle exposure image) from the interface circuit 218 or from the RDMA1 212, and may receive a first image (long exposure image) from the RDMA2 213 through the first circuit 219. The mixer 211 may receive weights from the RDMA3 214 through the first circuit 219. The mixer 211 may synthesize a first HDR image based on the first image, the second image, and weights, and may generate a first weight reflecting a synthesis ratio of the first image and the second image when synthesizing the first HDR image. The first weight may include weight values corresponding to each pixel of the first HDR image, and the weight value may have any one of values from 0 to 255.

In some example embodiments, the mixer 211 may store the synthesized HDR image and the generated first weight in WDMA. For example, the mixer 211 may store a first HDR image synthesized based on the first image and the second image in the WDMA1 216, and may store, in the WDMA2 217, a first weight reflecting a synthesis ratio of the first image and the second image when synthesizing the first HDR image.

In some example embodiments, the mixer 211 may synthesize an HDR image by applying a weight based on a previously synthesized HDR image and an image corresponding to a certain exposure time, respectively, and may generate a third weight. For example, further referring to FIG. 2, the mixer 211 may receive a previously synthesized first HDR image from RDMA1 212 and receive a third image (short exposure image) from RDMA2 213. The mixer 211 may receive the second weight from RDMA3 214 and may receive the first weight from RDMA4 215. The second weight may include values corresponding to each pixel of the third image, and the weight value may have any one of values from 0 to 255. The first weight may include weight values corresponding to each pixel of the first HDR image, and the weight value may have any one of values from 0 to 255. The mixer 211 may synthesize a second HDR image by applying a first weight to a first HDR image and a second weight to a third image. When the mixer 211 synthesizes the second HDR image by applying the first weight and the second weight, [Equation 1] described above with reference to FIG. 1 may be used. The mixer 211 may generate a third weight that reflects a synthesis ratio of the first HDR image and the third image when synthesizing the second HDR image. The third weight may include weight values corresponding to each pixel of the second HDR image, and the weight value may have any one of values from 0 to 255.

In some example embodiments, the mixer 211 may store the synthesized HDR image and the generated third weight in the WDMA. For example, the mixer 211 may store a second HDR image synthesized based on the first HDR image and the third image in the WDMA1 216, and may store, in the WDMA2 217, a third weight reflecting a synthesis ratio of the first HDR image and the third image when synthesizing the second HDR image.

In some example embodiments, the mixer 211 may transmit the synthesized HDR image and the generated third weight to the post-processing module. For example, the image processor 200 of FIG. 1 may further include a post-processing module, and the post-processing module may receive the second HDR image and the third weight from the mixer 211. The post-processing module may perform a post-processing operation for removing noise based on the received second HDR image and the third weight, and some example embodiments of this will be described later with reference to FIG. 4.

Since the mixer 211 may synthesize a second HDR image by applying a first weight reflecting a synthesis ratio of the first image and the second image synthesized to the previously synthesized first HDR image to each pixel of the first HDR image, a second HDR image in which noise variance or motion is reflected may be synthesized.

The HDR synthesis circuit 210*a* may include a plurality of direct memory access (DMAs) capable of storing and reading data. DMA may include write direct memory access (WDMA) for storing data or read direct memory access (RDMA) for reading data. In some example embodiments, HDR synthesis circuit 210*a* may include a plurality of WDMAs 216 and 217. For example, the first HDR image and the second HDR image generated by the mixer 211 may be stored in the WDMA1 216. The first weight and the third weight generated by the mixer 211 may be stored in the WDMA2 217.

In some example embodiments, the HDR synthesis circuit 210*a* may include a plurality of RDMAs 212 to 215. For example, the RDMA1 212 may read the first HDR image stored in the WDMA1 216 and transmit the read first HDR image to the mixer 211. The RDMA4 215 may read the first weight stored in the WDMA2 217 and transmit it to the mixer 211.

The HDR synthesis circuit 210*a* has been described as including two WDMAs 216 and 217 and four RDMAs 212 to 215, but the technical ideas of the inventive concepts are not limited thereto. For example, the HDR synthesis circuit 210*a* may include at least one WDMA (not shown) that receives and stores the first, second, and third images from the interface circuit 218. The RDMA1 212 may read the second image stored in WDMA (not shown) and transmit it to mixer 211, and the RDMA2 213 may read the first image or the third image stored in the WDMA (not shown) and transmit the first image or the third image to the first circuit 219. The RDMA3 214 may read weights or second weights stored in WDMA (not shown) and transmit the weights or the second weights to the first circuit 219.

The interface circuit 218 may receive a plurality of images corresponding to a plurality of exposure times. In some example embodiments, referring further to FIGS. 1 and 2, the interface circuit 218 may receive a first image, a second image, and a third image from the image sensor 100. The interface circuit 218 may transmit the received second image to the mixer 211 or may store it in a WDMA (not shown). The interface circuit 218 may store the received first and third images in a WDMA (not shown).

The first circuit 219 may perform an operation to adjust shaking or motion for two different images. In some example embodiments, further referring to FIG. 2, the mixer 211 may receive the first image from the RDMA2 213 before synthesizing the first HDR image based on the first image and the second image. Since the first image and the second image have different exposure times, motion or shaking may occur for the same object. At this time, the first circuit 219 may perform an operation of correcting motion or shaking of the first image based on the second image, and may transmit the corrected first image to the mixer 211.

Figure 4:
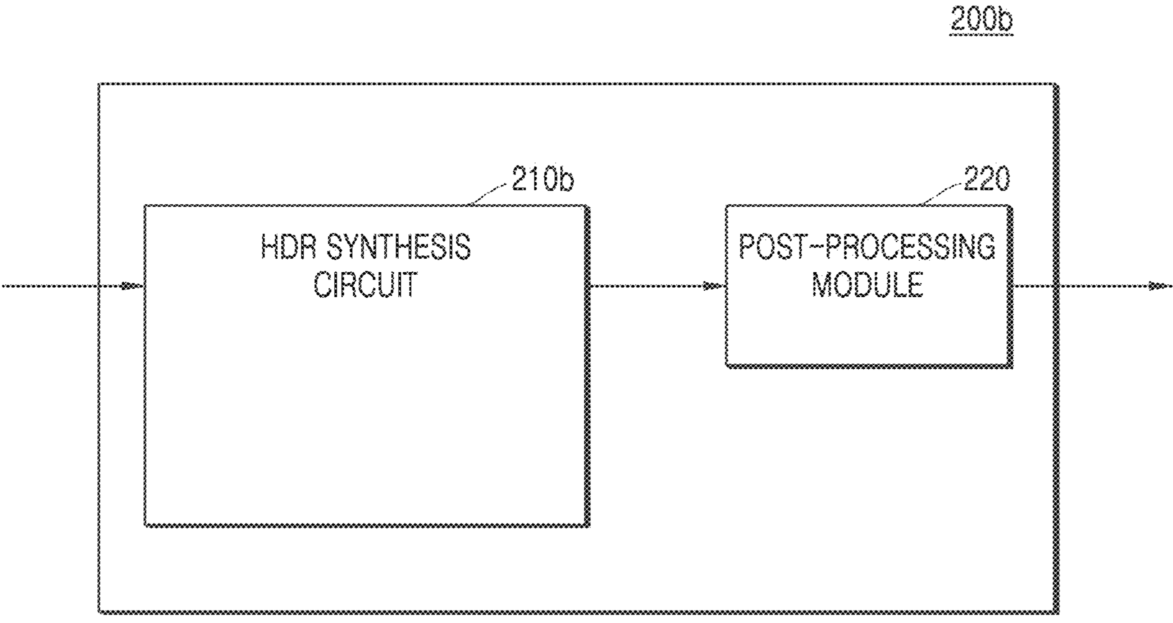
FIG. 4 is a block diagram illustrating an image processor according to some example embodiments.

FIG. 4 is a block diagram showing a processor according to some example embodiments. In some example embodiments, image processor 200*b* of FIG. 4 may be an example of image processor 200 of FIG. 1.

Referring to FIGS. 1 and 4, the image processor 200*b* may include an HDR synthesis circuit 210*b* and a post-processing module 220. In some example embodiments, the HDR synthesis circuit 210*b* of FIG. 4 may be identical to the HDR synthesis circuit 210 of FIG. 1. Descriptions overlapping with those of FIG. 1 will be omitted.

The post-processing module 220 may perform a post-processing operation to reduce noise of the HDR image. In some example embodiments, the post-processing module 220 may receive the second HDR image and the third weight from the HDR synthesis circuit 210*b*, and may remove noise of the second HDR image by applying noise reduction (NR) strength based on the third weight. For example, the post-processing module 220 may be a YUV noise reduction module that applies the NR intensity to the second HDR image based on the third weight. When synthesizing the second HDR image, the HDR synthesizing circuit 210*b* may apply a first weight to the previously synthesized first HDR image. Accordingly, when the first HDR image is synthesized, a portion where the first image and the second image are synthesized may be distinguished by a weight value, and the HDR synthesizing circuit 210*b* may synthesize a second HDR image by reflecting the weight value and generate a third weight. The third weight may include weight values reflecting a synthesis ratio of the first HDR image and the third image when the second HDR image is synthesized.

In a comparative embodiment, when the second HDR image is synthesized, the same weight may be applied to the previously synthesized first HDR image, and accordingly, when the first HDR image is synthesized, a portion in which the first image and the second image are synthesized cannot be distinguished by a weight value. Then, when a second HDR image is synthesized based on the first HDR image and the third image and a post-processing operation is performed to remove noise, consistent NR strength is applied, so that a noise non-uniformity problem arises in which the noise between the synthesized part of the second image and the synthesized part of the first image is not uniform. In contrast, in some example embodiments, when the second HDR image is synthesized, since the HDR synthesizing circuit 210*b* applies a first weight including a weight value for each pixel to the previously synthesized first HDR image, NR intensity suitable for the first image and second image synthesis ratio may be applied, so that, in the final image (e.g., an image generated by performing a post-processing operation on the second HDR image), the noise non-uniformity problem may be improved or solved and the noise may be improved. For example, according to some example embodiments, there may be an increase in accuracy of image production and noise removal based on the above methods. Therefore, the improved devices and methods overcome the deficiencies of the conventional devices and methods to noise removal (for example, in HDR synthesizing of captured images) while reducing resource consumption and increasing data clarity. For example, by using the disclosed weight values and weight maps, the post-processing module 220 may require fewer resources, such as memory access and/or power to drive circuitry to produce an improved image.

Figure 5:
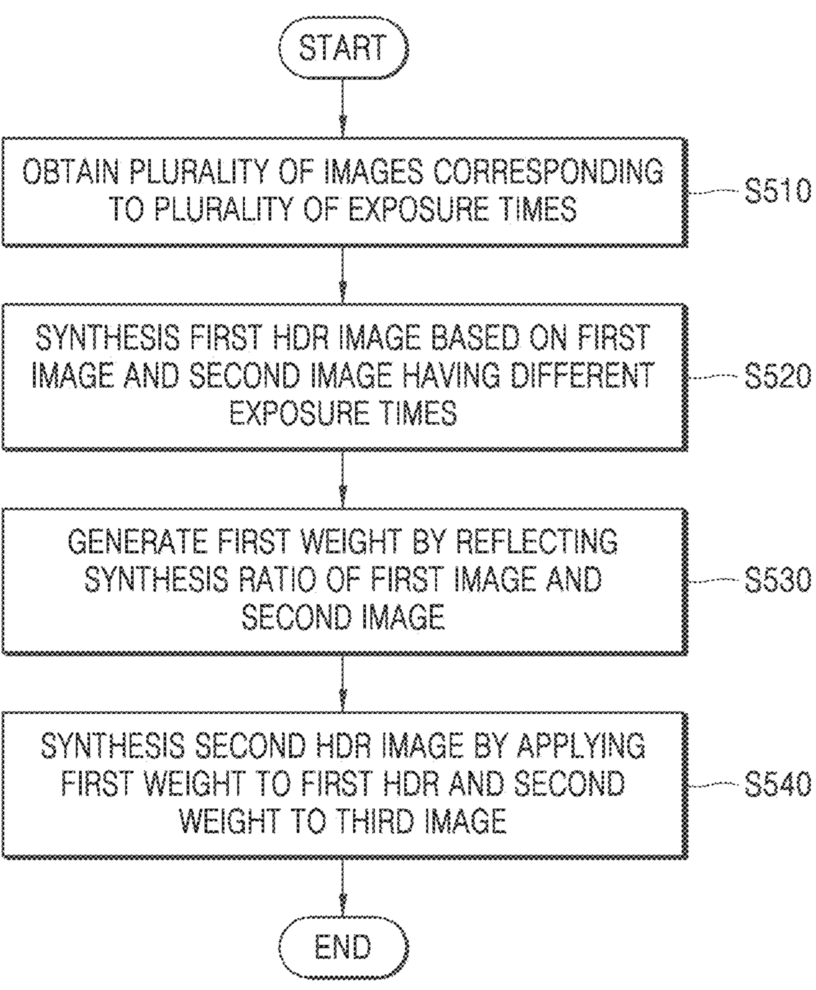
FIG. 5 is a flowchart illustrating an operating method of an image processor synthesizing an HDR image, according to some example embodiments.

FIG. 5 is a flowchart illustrating an operating method of an image processor synthesizing an HDR image according to some example embodiments. As shown in FIG. 5, the operating method of the image processor synthesizing the HDR image may include a plurality of operations S510 to S540.

Further referring to FIGS. 1 to 3, in operation S510, the HDR synthesis circuit 210*a* may acquire a plurality of images corresponding to a plurality of exposure times. In some example embodiments, the image sensor 100 may generate three images corresponding to three exposure times, and the interface circuit 218 may receive three images corresponding to three exposure times from the image sensor 100. For example, the image sensor 100 may generate a first image corresponding to the first exposure time, a second image corresponding to a second exposure time shorter than the first exposure time, and a third image corresponding to a third exposure time shorter than the second exposure time. The interface circuit 218 may receive a first image, a second image, and a third image from the image sensor 100 and transmit the second image to the mixer 211 or WDMA (not shown). The interface circuit 218 may transmit the first image or the third image to WDMA (not shown). The RDMA1 212 may read a second image from WDMA (not shown), and RDMA2 213 may read a first or third image from WDMA (not shown).

In operation S520, the mixer 211 may synthesize a first HDR image based on the first image and the second image having different exposure times. In some example embodiments, the mixer 211 may receive a second image from interface circuit 218 or from RDMA1 212 and receive a first image from RDMA2 213 through the first circuit 219. The mixer 211 may receive weights from the RDMA3 214 through the first circuit 219. The mixer 211 may synthesize a first HDR image based on the received first image, the second image, and weights.

In operation S530, when the mixer 211 synthesizes the first HDR image in operation S520 of FIG. 5, a first weight may be generated based on a synthesis ratio (for example, by reflecting the synthesis ratio) of the first image and the second image. In some example embodiments, the mixer 211 may generate a weight map including the first weights. For example, when synthesizing the first HDR image, a first weight reflecting a synthesis ratio of the first image and the second image may be generated. The first weight may include weight values corresponding to each pixel of the first HDR image, and the weight value may have any one of values from 0 to 255.

In operation S540, the mixer 211 may synthesize a second HDR image based on the previously synthesized first HDR image and the third image, and when synthesizing the second HDR image, the mixer 211 may apply a weight corresponding to each pixel of the first HDR image and the third image. In some example embodiments, the mixer 211 may synthesize a second HDR image by applying a first weight to a first HDR image and a second weight to a third image. When the mixer 211 synthesizes the second HDR image by applying the first weight and the second weight, [Equation 1] described above with reference to FIG. 1 may be used. The first weight may include weight values corresponding to each pixel of the first HDR image, and the HDR image may be synthesized by reflecting the synthesis weight of the two images for each pixel. For example, HDR images in which noise variance or motion are reflected may be synthesized.

Figure 6:
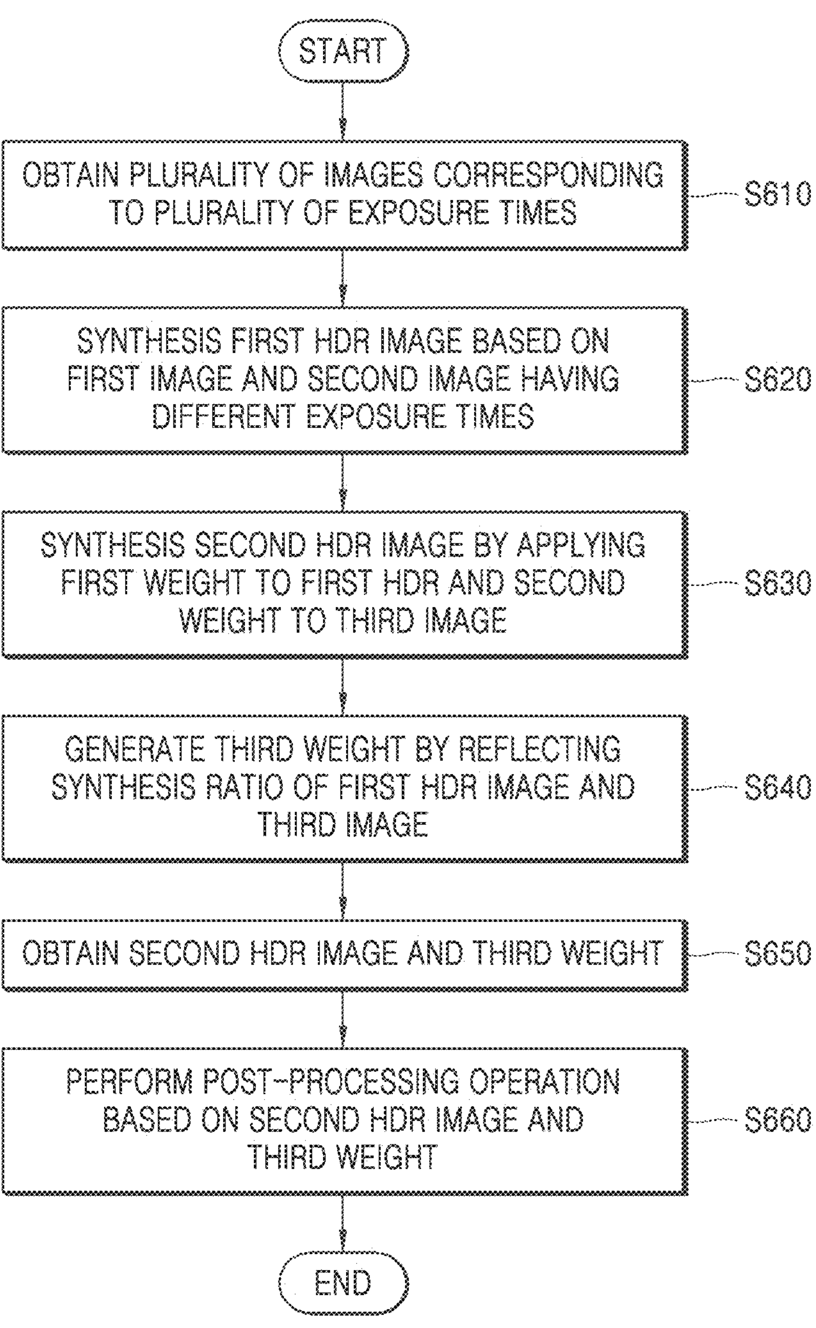
FIG. 6 is a flowchart illustrating an operating method of an image processing system for synthesizing HDR images, according to some example embodiments.

FIG. 6 is a flowchart illustrating an operating method of an image processor synthesizing an HDR image according to some example embodiments. As shown in FIG. 6, the method of operating the image processing system for synthesizing HDR images may include a plurality of operations S610 to S660.

Further referring to FIGS. 2 and 4, in operation S610, the HDR synthesis circuit 210*b* may acquire a plurality of images corresponding to a plurality of exposure times. In operation S620, the HDR synthesizing circuit 210*b* may synthesize a first HDR image based on the first image and the second image having different exposure times. In operation S630, the HDR synthesis circuit 210*b* may synthesize a second HDR image by applying a first weight to the first HDR image and a second weight to the third image. In some example embodiments, operations S610 to S630 may be the same as operations S510, S520, and S540 of FIG. 5. Descriptions overlapping with those of FIG. 5 will be omitted.

When the HDR synthesizing circuit 210*b* synthesizes the second HDR image in operation S640, the HDR synthesizing circuit 210*b* may generate a third weight based on the synthesizing ratio (for example, by reflecting the synthesizing ratio) of the first HDR image and the third image. In some example embodiments, the HDR synthesis circuit 210*b* may generate a weight map including a third weight. For example, when synthesizing the second HDR image, a third weight may be generated reflecting a synthesis ratio of the first HDR image and the third image. The third weight may include weight values corresponding to each pixel of the second HDR image, and the weight value may have any one of values from 0 to 255.

In operation S650, the post-processing module 220 may obtain a second HDR image and a third weight from the HDR synthesis circuit 210*b*. In operation S660, the post-processing module 220 may perform a post-processing operation for removing noise based on the received second HDR image and the third weight. In some example embodiments, the post-processing module 220 may be a noise reduction module, and may generate a noise-removed image by performing a post-processing operation on the second HDR image based on the third weight. Since The HDR synthesis circuit 210*b* applies a first weight corresponding to each pixel of the first HDR image to the previously synthesized first HDR image, and applies a second weight corresponding to each pixel of the third image to the third image to synthesize the second HDR image, in the second HDR image, a synthesized portion of the first image and the second image may be distinguished. Accordingly, when the post-processing module 220 performs a post-processing operation on the second HDR image, it is possible to apply different NR intensities for each pixel and improve or solve the noise non-uniformity problem. For example, according to some example embodiments, there may be an increase in accuracy of image production and noise removal based on the above methods. Therefore, the improved devices and methods overcome the deficiencies of the conventional devices and methods to noise removal (for example, in HDR synthesizing of captured images) while reducing resource consumption and increasing data clarity. For example, by using the disclosed weight values and weight maps, the post-processing module 220 may require fewer resources, such as memory access and/or power to drive circuitry to produce an improved image.

Figure 7:
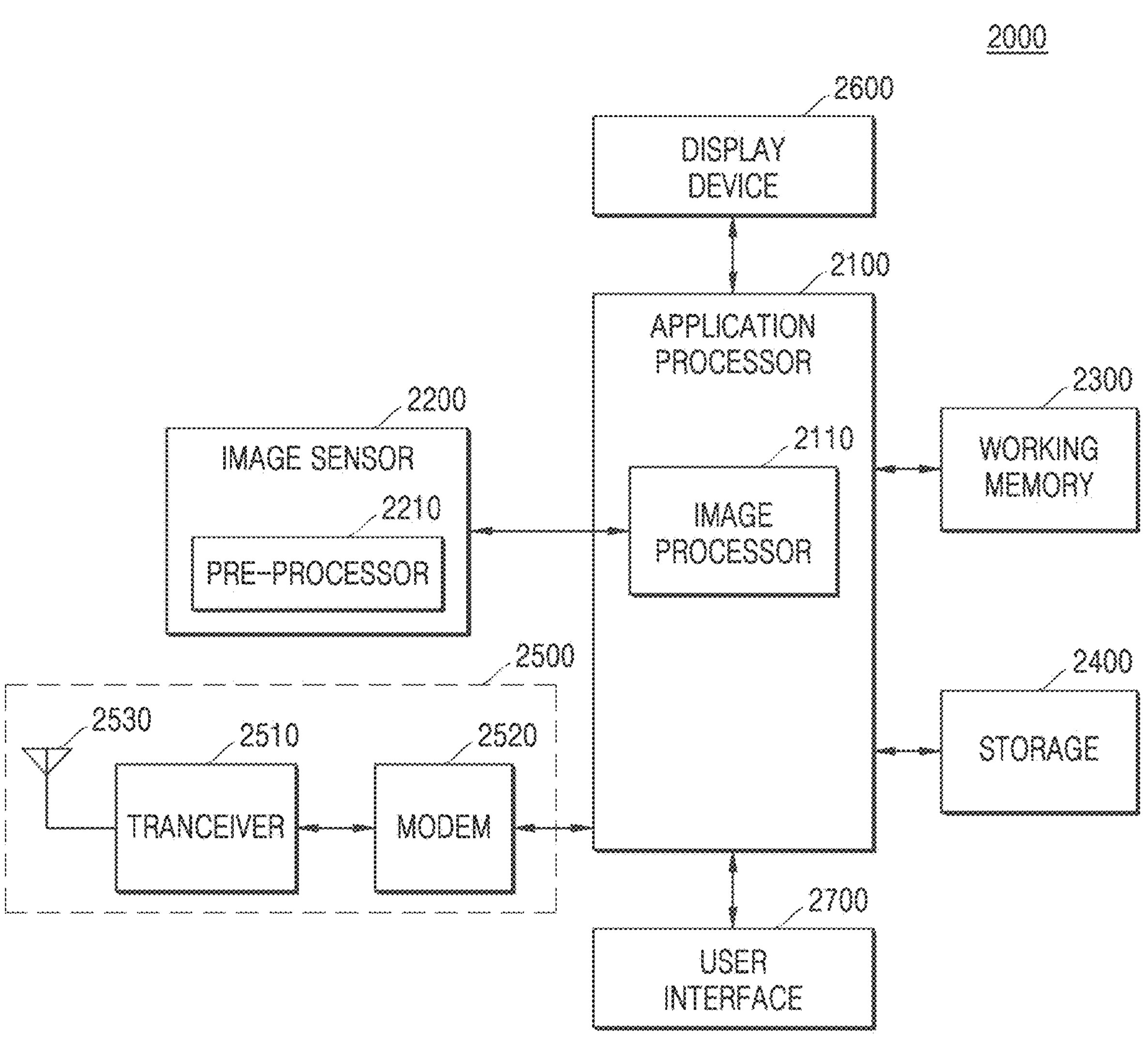
FIG. 7 is a block diagram illustrating an image processing system according to some example embodiments.

FIG. 7 is a block diagram illustrating an image processing system according to some example embodiments. The image processing system 2000 of FIG. 7 may be a portable terminal.

Referring to FIG. 7, the image processing system 2000 includes an application processor 2100, an image sensor 2200, a display device 2600, a working memory 2300, a storage 2400, a user interface 2700, and a wireless transmission/reception unit 2500.

The application processor 2100 controls overall operations of the image processing system 2000 and may be implemented as a system-on-chip (SoC) that drives application programs and an operating system. The application processor 2100 may provide image data provided from the image sensor 2200 to the display device 2600 or store the image data in the storage 2400. The application processor 2100 may include an image processor 2110. The image processor 2110 may perform image processing, such as image quality adjustment and data format change, on image data received from the image sensor 2200.

The image processor described with reference to FIGS. 1 to 6 may be applied as the image processor 2110. The image processor 2110 may receive a plurality of images corresponding to a plurality of exposure times from the image sensor 2200 and synthesize a first HDR image based on a first image and a second image among the plurality of images. The image processor 2110 applies a first weight value including weight values corresponding to each pixel of the first HDR image to the previously synthesized first HDR image, and applies a second weight value including weight values corresponding to each pixel of the third image to a third image among a plurality of images to synthesize a second HDR image. The image processor 2110 may perform a post-processing operation for noise removal on the second HDR image. When synthesizing the second HDR image, since the first weight including the weight values corresponding to each pixel is applied, different NR intensities may be applied and the noise non-uniformity problem may be improved or solved.

The working memory 2300 may be implemented with a volatile memory, such as DRAM, SRAM, and the like, or a non-volatile resistive memory, such as FeRAM, RRAM, PRAM, and the like. The working memory 2300 may store programs and/or data processed or executed by the application processor 2100.

The storage 2400 may be implemented as a nonvolatile memory device, such as NAND flash, resistive memory, and the like, and for example, the storage 2400 may be provided as a memory card (e.g., MMC, eMMC, SD, and micro SD), and the like. The storage 2400 may store image data provided from the image sensor 2200.

The user interface 2700 may be implemented with various devices capable of receiving user input, such as a keyboard, a curtain key panel, a touch panel, a fingerprint sensor, a microphone, and the like. The user interface 2700 may receive a user input and provide a signal corresponding to the received user input to the application processor 2100.

The wireless transmission/reception unit 2500 may include a transceiver 2510, a modem 2520 and an antenna 2530.

Figure 8:
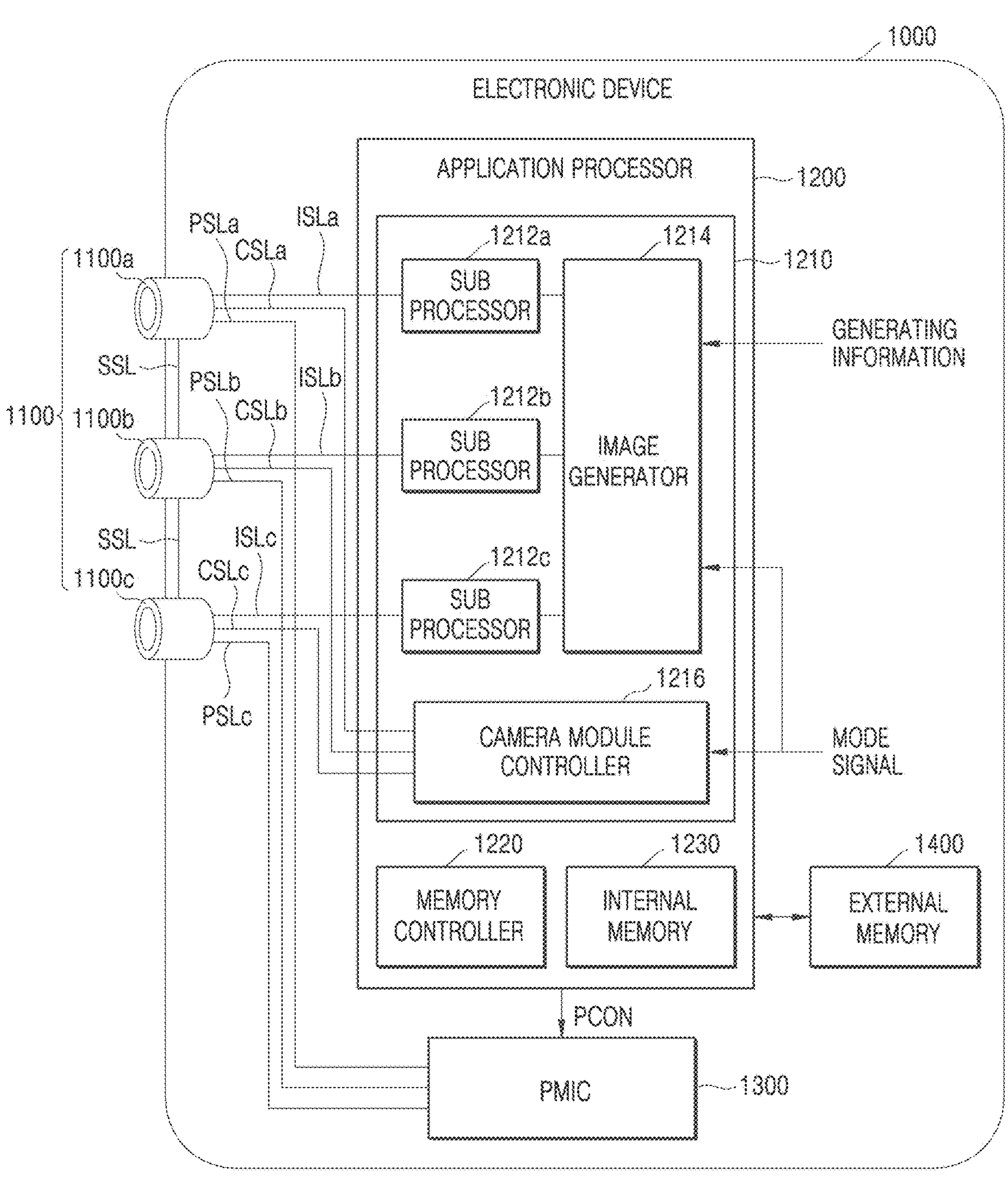
FIG. 8 is a block diagram of an electronic device including a multi-camera module.

FIG. 8 is a block diagram of an electronic device including a multi-camera module.

Referring to FIG. 8, an electronic device 1000 may include a camera module group 1100, an application processor 1200, a power management integrated circuit (PMIC) 1300, and an external memory 1400.

The camera module group 1100 may include a plurality of camera modules 1100*a*, 1100*b*, and 1100*c*. Although the drawing shows some example embodiments in which three camera modules 1100*a*, 1100*b*, and 1100*c* are disposed, the example embodiments are not limited thereto. In some example embodiments, the camera module group 1100 may include only two camera modules or may be modified to include n (n is a natural number of 4 or more) camera modules.

The application processor 1200 may include an image processing device 1210, a memory controller 1220, and an internal memory 1230. The application processor 1200 may be implemented separately from the plurality of camera modules 1100*a*, 1100*b*, and 1100*c*, for example, as a separate semiconductor chip.

The image processing device 1210 may include a plurality of sub image processors 1212*a*, 1212*b*, and 1212*c*, an image generator 1214, and a camera module controller 1216.

The image processing device 1210 may include a plurality of sub image processors 1212*a*, 1212*b*, and 1212*c* corresponding to the number of the plurality of camera modules 1100*a*, 1100*b*, and 1100*c*.

The image processing device 1210 may receive a plurality of images corresponding to a plurality of exposure times from the plurality of camera modules 1100*a*, 1100*b*, and 1100*c*, and may synthesize a first HDR image based on a first image and a second image among a plurality of images. The image processing device 1210 applies a first weight value including weight values corresponding to each pixel of the first HDR image to the previously synthesized first HDR image, and applies a second weight value including weight values corresponding to each pixel of the third image to a third image among a plurality of images to synthesize a second HDR image. The image processing device 1210 may perform a post-processing operation for noise removal on the second HDR image. When synthesizing the second HDR image, since the first weight including the weight values corresponding to each pixel is applied, different NR intensities may be applied and the noise non-uniformity problem may be improved or solved.

The image data generated from the camera module 1100*a* may be provided to the sub image processor 1212*a* through the image signal line ISLa, image data generated from the camera module 1100*b* may be provided to the sub image processor 1212*b* through the image signal line ISLb, and image data generated by the camera module 1100*c* may be provided to the sub image processor 1212*c* through the image signal line ISLc. Such image data transmission may be performed using, for example, a Camera Serial Interface (CSI) based on Mobile Industry Processor Interface (MIPI), but embodiments are not limited thereto.

Meanwhile, in some example embodiments, one sub image processor may be arranged to correspond to a plurality of camera modules. For example, the sub image processor 1212*a* and the sub image processor 1212*c* are not implemented separately from each other as shown, but integrated into one sub image processor, and image data provided from the camera modules 1100*a* and 1100*c* may be selected through a selection element (e.g., a multiplexer) and then provided to the integrated sub image processor. In this case, the sub image processor 1212*b* is not integrated and may receive image data from the camera module 1100*b*.

In addition, in some example embodiments, the image data generated from the camera module 1100*a* may be provided to the sub image processor 1212*a* through the image signal line ISLa, image data generated from the camera module 1100*b* may be provided to the sub image processor 1212*b* through the image signal line ISLb, and image data generated by the camera module 1100*c* may be provided to the sub image processor 1212*c* through the image signal line ISLc. In some example embodiments, the image data processed by the sub image processor 1212*b* is directly provided to the image generator 1214, but any one of the image data processed by the sub image processor 1212*a* and the image data processed by the sub image processor 1212*c* may be selected through a selection element (e.g., a multiplexer), and then may be provided to the image generator 1214.

Each of the sub image processors 1212*a*, 1212*b*, and 1212*c* may perform image processing, such as bad pixel correction, 3A adjustment (Auto-focus correction, Auto-white balance, Auto-exposure), noise reduction, sharpening, gamma control, re-mosaic, and the like, on image data provided from the camera modules 1100*a*, 1100*b*, and 1100*c*.

In some example embodiments, re-mosaic signal processing may be performed in each of the camera modules 1100*a*, 1100*b*, and 1100*c* and then provided to the sub image processors 1212*a*, 1212*b*, and 1212*c*.

Image data processed by each of the sub image processors 1212*a*, 1212*b*, and 1212*c* may be provided to the image generator 1214. The image generator 1214 may generate an output image using image data provided from each of the sub image processors 1212*a*, 1212*b*, and 1212*c* according to image generating information or a mode signal.

For example, the image generator 1214 may generate an output image by merging at least some of the image data generated by the image processors 1212*a*, 1212*b*, and 1212*c* according to image generation information or a mode signal. Also, the image generator 1214 may generate an output image by selecting one of image data generated by the image processors 1212*a*, 1212*b*, and 1212*c* according to image generation information or a mode signal.

In some example embodiments, the image creation information may include a zoom signal or zoom factor. Also, in some example embodiments, the mode signal may be a signal based on a mode selected by a user, for example.

When the image generation information is a zoom signal (zoom factor) and each of the camera modules 1100*a*, 1100*b*, and 1100*c* has different fields of view (viewing angles), the image generator 1214 may perform different operations according to the type of zoom signal. For example, when the zoom signal is the first signal, among the image data output from the sub image processor 1212*a* and the image data output from the sub image processor 1212*c*, an output image may be generated using image data output from the sub image processor 1212*a* and image data output from the sub image processor 1212*b*. If the zoom signal is a second signal different from the first signal, among the image data output from the sub image processor 1212*a* and the image data output from the sub image processor 1212*c*, the image generator 1214 may generate an output image using image data output from the sub image processor 1212*c* and image data output from the sub image processor 1212*b*. If the zoom signal is a third signal different from the first and second signals, the image generator 1214 may generate an output image by selecting any one of image data output from each of the sub image processors 1212*a*, 1212*b*, and 1212*c* without merging the image data. However, the example embodiments are not limited thereto, and a method of processing image data may be modified and implemented as needed.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to example embodiments thereof, it will be understood that various changes in form and details may be made therein without departing from the spirit and scope of the following claims.

What is claimed is:

1. An image processor comprising:

an interface circuit configured to receive a plurality of images corresponding to a plurality of exposure times from an external sensor, each of the plurality of exposure times having different lengths; and a high dynamic range (HDR) synthesis circuit configured to synthesize a first HDR image, based on a first image and a second image among the plurality of images, synthesize a second HDR image, based on a third image among the plurality of images and the first HDR image, apply a first weight including weight values respectively corresponding to pixels of the first HDR image to the first HDR image to synthesize the second HDR image, wherein the first weight comprises the weight values based on a synthesis ratio of the first image and the second image when the first HDR image is synthesized, and apply a second weight including weight values respectively corresponding to pixels of the third image to the third image to synthesize the second HDR image.

2. The image processor of claim 1, wherein the HDR synthesis circuit comprises:

a mixer configured to synthesize the first HDR image or the second HDR image; and a direct memory access (DMA) configured to store the first weight.

3. The image processor of claim 1, wherein the plurality of exposure times comprise a first exposure time, a second exposure time shorter than the first exposure time, and a third exposure time shorter than the second exposure time, the first image is an image corresponding to the first exposure time, the second image is an image corresponding to the second exposure time, and the third image is an image corresponding to the third exposure time.

4. The image processor of claim 2, wherein the mixer is configured to generate the first weight including weight values based on the synthesis ratio of the first image and the second image when synthesizing the first HDR image, and transmit the first weight to the DMA.

5. The image processor of claim 1, further comprising a post-processing circuit configured to perform a post-processing operation for noise removal, based on the second HDR image and a third weight including weight values corresponding to pixels of the second HDR image, wherein the HDR synthesis circuit generates a weight map, and the weight map comprises the first weight, the second weight and the third weight.

6. The image processor of claim 5, wherein the weight map comprises a weight based on at least one of noise variance and motion for each pixel of the plurality of images.

7. The image processor of claim 5, wherein the post-processing circuit comprises a noise reduction circuit.

8. The image processor of claim 5, wherein the HDR synthesis circuit comprises:

a mixer configured to synthesize the first HDR image or the second HDR image;

a write direct memory access (WDMA) configured to receive the weight map from the mixer and store the received weight map; and a read direct memory access (RDMA) configured to receive the stored weight map from the WDMA and transmit the weight map received from the WDMA to the mixer.

9. The image processor of claim 5, wherein the third weight comprises weight values based on a synthesis ratio of the third image and the first HDR image when the second HDR image is synthesized.

10. An operating method of an image processor including a high dynamic range (HDR) synthesis circuit, the method comprising:

obtaining a plurality of images corresponding to a plurality of exposure times;

synthesizing a first HDR image, based on a first image and a second image each having different exposure times among the plurality of images; and applying a first weight including weight values respectively corresponding to pixels of the first HDR image to the first HDR image, and applying a second weight including weight values respectively corresponding to pixels of a third image to the third image, to synthesize a second HDR image, wherein the first weight comprises the weight values based on a synthesis ratio of the first image and the second image when the first HDR image is synthesized, the plurality of images including the third image, an exposure time corresponding to the third image being shorter than an exposure time corresponding to the first image and an exposure time corresponding to the second image.

11. The method of claim 10, further comprising: as an operating method of an image processor further comprising a post-processing circuit, obtaining, by the post-processing circuit, the second HDR image and a third weight from the HDR synthesis circuit;

performing, by the post-processing circuit, a post-processing operation for removing noise, based on the second HDR image and the third weight, wherein the synthesizing of the second HDR image further comprises generating the third weight based on a synthesis ratio of the first HDR image and the third image when the second HDR image is synthesized.

12. The method of claim 11, wherein the third weight comprises weight values based on the synthesis ratio of the third image and the first HDR image when the second HDR image is synthesized.

13. The method of claim 11, wherein the post-processing circuit comprises a noise reduction circuit.

14. An image processing system comprising:

an image sensor configured to generate a plurality of images corresponding to a plurality of exposure times, each of the plurality of exposure times having different lengths; and a processor configured to receive the plurality of images from the image sensor, synthesize a first high dynamic range (HDR) image, based on selected ones of the plurality of images having different exposure times, synthesize a second HDR image, based on the first HDR image and any one of the plurality of images having a different exposure time from the selected ones of the plurality of images, apply a first weight including weight values respectively corresponding to pixels of the first HDR image to the first HDR image to synthesize the second HDR image, wherein the first weight comprises the weight values based on a synthesis ratio of the first image and the second image when the first HDR image is synthesized, and apply a second weight including weight values respectively corresponding to pixels of the any one of the plurality of images to the any one of the plurality of images to synthesize the second HDR image.

15. The image processing system of claim 14, wherein the processor comprises:

a mixer configured to synthesize the first HDR image or the second HDR image and generate a weight map;

a direct memory access (DMA) configured to store the first weight; and a post-processing circuit configured to perform a post-processing operation for removing noise, based on the second HDR image and a third weight including weight values corresponding to pixels of the second HDR image, and the weight map comprises the first weight, the second weight and the third weight.

16. The image processing system of claim 15, wherein the weight map is a weight based on at least one of noise variance and motion for each pixel of the plurality of images.

17. The image processing system of claim 15, wherein the third weight comprises weight values based on a synthesis ratio between one of the plurality of images and the first HDR image when a second HDR image is synthesized.

18. The image processing system of claim 14, wherein the plurality of exposure times comprise a first exposure time, a second exposure time shorter than the first exposure time, and a third exposure time shorter than the second exposure time, the plurality of images comprise a first image corresponding to the first exposure time, a second image corresponding to the second exposure time, and a third image corresponding to the third exposure time, the first HDR image is generated based on the first image and the second image, and the any one image among the plurality of images is the third image.

* * * * *